(12) United States Patent
Cho et al.

(10) Patent No.: US 12,524,182 B2
(45) Date of Patent: Jan. 13, 2026

(54) STORAGE DEVICE, STORAGE CONTROLLER AND OPERATING METHOD OF STORAGE CONTROLLER

(71) Applicant: Samsung Electronics Co., Ltd., Suwon-si (KR)

(72) Inventors: Yonghoon Cho, Suwon-si (KR); Daekyu Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 2 days.

(21) Appl. No.: 18/528,272

(22) Filed: Dec. 4, 2023

(65) Prior Publication Data

US 2024/0231701 A1 Jul. 11, 2024

(30) Foreign Application Priority Data

Jan. 11, 2023 (KR) .......................... 10-2023-0004292

(51) Int. Cl.
*G06F 3/06* (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
USPC ......................................................... 711/154
See application file for complete search history.

(56) References Cited

U.S. PATENT DOCUMENTS

| | | | |
|---|---|---|---|
| 9,626,307 B2 | 4/2017 | Kim | |
| 10,126,982 B1 * | 11/2018 | Colgrove | ............ G06F 11/1076 |
| 10,353,628 B2 | 7/2019 | Kachare et al. | |
| 10,714,159 B2 | 7/2020 | Hasbun et al. | |
| 11,036,426 B2 | 6/2021 | Jung | |
| 11,106,366 B1 * | 8/2021 | Bhatia | ................... G06F 3/0679 |
| 11,119,693 B2 | 9/2021 | Ahn et al. | |
| 2016/0231948 A1 * | 8/2016 | Gupta | ................... G06F 3/0688 |
| 2016/0283119 A1 * | 9/2016 | Frickey, III | ............. G06F 3/061 |
| 2016/0299690 A1 * | 10/2016 | Jung | ..................... G06F 3/0688 |
| 2018/0335976 A1 * | 11/2018 | DeRosa | ................ G06F 3/0611 |
| 2020/0394074 A1 | 12/2020 | Lee et al. | |
| 2021/0191884 A1 * | 6/2021 | Hwang | ................. G06F 13/161 |

FOREIGN PATENT DOCUMENTS

KR 102088944 B1 5/2020

* cited by examiner

*Primary Examiner* — Gautam Sain

(74) *Attorney, Agent, or Firm* — Harness, Dickey & Pierce, P.L.C.

(57) ABSTRACT

Provided is an operating method of a storage controller. The method includes fetching, by a processor, a command for a non-volatile memory received from a host, dividing, by the processor, the command into internal processing units, transmitting, by the processor, a first time point at which the command is divided into internal processing units to a latency calculation circuit, executing, by the processor, the command of an internal processing unit to a memory, transmitting, by the processor, a second time point at which the command of an internal processing unit is executed to the latency calculation circuit, calculating, by the latency calculation circuit, latency for the command based on the received first time point and the received second time point, and determining, by the latency calculation circuit, whether the calculated latency exceeds a preset threshold latency.

20 Claims, 13 Drawing Sheets

STORAGE DEVICE, STORAGE CONTROLLER AND OPERATING METHOD OF STORAGE CONTROLLER

CROSS-REFERENCE TO RELATED APPLICATION

This application is based on and claims priority under 35 U.S.C. § 119 to Korean Patent Application No. 10-2023-0004292, filed on Jan. 11, 2023, in the Korean Intellectual Property Office, the disclosure of which is incorporated by reference herein in its entirety.

BACKGROUND

The inventive concepts relate to a storage device, and more particularly, to a storage controller, a storage device including the storage controller, and a method of operating the storage controller.

A storage system may include a host and a storage device, and the storage device may include a memory and a storage controller for controlling the memory. Memory may be largely classified into non-volatile memory and volatile memory. As non-volatile memory, storage devices including flash memory, such as an embedded Multi-Media Card (eMMC), a Universal Flash Storage (UFS), a Solid State Drive (SSD), and a memory card, have been widely used recently, and are usefully used to store or move a large amount of data.

The storage device provides data stored in a memory to the host according to a host's read command, and stores data in the memory according to a host's write command. If the execution time of the command requested by the host to the storage device becomes long, a latency spike may occur. Since the host may have various and complex workloads to achieve a desired data management function, latency standards required for each host may vary. Due to this complexity, the demand for research to predict the latency at which latency spikes occur is steadily increasing.

SUMMARY

The inventive concepts provide a storage controller capable of predicting the internal latency of a storage device itself, independently of the host's complex workload situation when predicting the latency at which latency spikes occur, and an operating method thereof. As a result, internal latency may be predicted more accurately, resulting in a more efficient and/or improved storage system, storage device, method, and/or memory.

According to an aspect of the inventive concepts, there is provided a storage device including a non-volatile memory, and a storage controller configured to control the non-volatile memory, wherein the storage controller includes a processor configured to receive and fetch a command for the non-volatile memory from a host, divide and execute the command into internal processing units, and transmit completion of the command to the host, and a latency calculation circuit configured to calculate a latency for the command by receiving, from the processor, a first time point at which the processor divides the command into internal processing units and a second time point at which the processor executes the command of the internal processing unit, wherein the latency calculation circuit is configured to determine whether the latency calculated based on the received first time point and the received second time point exceeds a preset threshold latency.

According to another aspect of the inventive concepts, there is provided an operating method of a storage controller, the method including fetching, by a processor, a command for a non-volatile memory received from a host, dividing, by the processor, the command into internal processing units, transmitting, by the processor, a first time point at which the command is divided into internal processing units to a latency calculation circuit, executing, by the processor, the command of an internal processing unit to a memory, transmitting a second time point at which the command of an internal processing unit is executed to the latency calculation circuit, calculating, by the latency calculation circuit, latency for the command based on the received first time point and the received second time point, and determining, by the latency calculation circuit, whether the calculated latency exceeds a preset threshold latency.

According to another aspect of the inventive concepts, there is provided a storage system comprising a host; and a storage device configured to receive a command from the host and transmit a completion of the command to the host, wherein the storage device comprises a storage controller configured to divide commands into internal processing units and executes the commands in the internal processing units and a latency calculation circuit configured to calculate a latency for the command based on a first time point at which the command is divided into internal processing units and a second time point at which the command of the internal processing unit is executed, and determine whether the calculated latency exceeds a preset threshold latency.

BRIEF DESCRIPTION OF THE DRAWINGS

Example embodiments will be more clearly understood from the following detailed description taken in conjunction with the accompanying drawings in which:

FIG. 7 is a flowchart illustrating a method of operating a processor for calculating a latency of a read command, according to example embodiments;

FIG. 8 is a flowchart illustrating a method of operating a processor for calculating a latency of a write command, according to example embodiments;

FIG. 9 is a flowchart illustrating a method of operating a processor for calculating a latency of a write command, according to other example embodiments;

FIG. 10 is a flowchart illustrating a method of operating a processor for calculating a latency of a trim command, according to example embodiments;

DETAILED DESCRIPTION OF EXAMPLE EMBODIMENTS

Hereinafter, example embodiments of the inventive concepts will be described in detail with reference to the accompanying drawings.

In the following description, specific details about specific configurations and elements are only intended to help the overall understanding of example embodiments. Therefore, it is obvious to those skilled in the art that various changes and modifications may be made to the example embodiments described herein without departing from the scope of the inventive concepts.

Descriptions of well-known configurations and functions are omitted for clarity and conciseness. Terms to be described later are terms defined in consideration of functions in the inventive concepts, and may vary according to users and their intentions or customs. Therefore, definitions of terms should be determined based on the contents described throughout this specification.

The inventive concepts may have various modifications and various example embodiments, some of which will be described later in detail with reference to the accompanying drawings. However, it should be understood that the inventive concepts are not limited to the example embodiments described below and includes all modifications, equivalents and alternatives within the scope of the inventive concepts.

Terms including ordinal numbers such as first and second may be used to describe various elements, but structural elements are not limited by the terms. Terms are only used to distinguish one element from another. For example, a first component could be referred to as a second component without departing from the scope of the inventive concepts. Similarly, a second structural element may also be referred to as a first structural element.

Terms used in this specification are only used to describe various example embodiments of the inventive concepts, and are not intended to limit the inventive concepts. The singular is intended to include the plural unless the context clearly dictates otherwise. The term "and/or" as used herein includes any and all combinations of one or more associated items.

The terms "comprise" or "having" herein shall be understood to mean the presence of any feature, number, step, operation, structural element, part or combination thereof, and it is not excluded that one or more other features, numbers, steps, operations, structural elements, components, or combinations thereof may be added or the existence thereof may be present.

Unless defined otherwise, all terms used herein have the same meaning as understood by one of ordinary skill in the art to which these inventive concepts belong. Terms such as those defined in commonly used dictionaries should be interpreted in the same meaning as in the context in the relevant technical field, and should not be interpreted in an ideal or excessively formal sense unless clearly defined in this specification.

Figure 1:
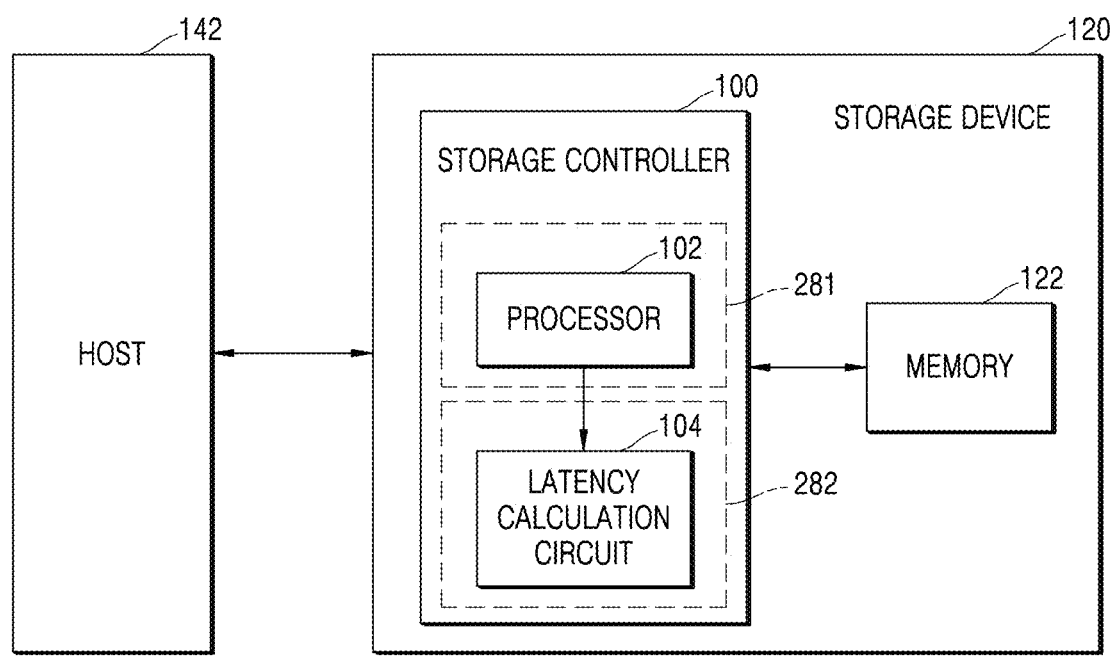
FIG. 1 is a diagram illustrating a storage system according to example embodiments.

FIG. 1 is a diagram illustrating a storage system according to example embodiments.

A storage system 140 according to example embodiments may include a host 142 and a storage device 120. Although one host 142 and one storage device 120 are shown, the storage system 140 may include multiple hosts 142 and/or multiple storage devices 120.

The storage device 120 may be used in connection with the host 142. The storage device 120 may exchange data with the host 142 through an interface of the host 142. The storage device 120 may receive power from the host 142 to perform an internal operation.

The storage device 120 may be a solid state device (SSD), universal flash storage (UFS), or the like. The storage device 120 may include a storage controller 100 and a buffer memory (for example, memory 122) connected to the storage controller 100. The storage controller 100 may be an SSD controller or a UFS controller.

When the storage device 120 is connected to the host 142, the host 142 may write data to the storage device 120 or read data stored in the storage device 120. The storage device 120 may exchange signals with the host 142 through an interface of the host 142 and receive power through a power connector of the storage device 120.

The storage controller 100 may include one or more processors 102, one or more latency calculation circuits 104, one or more error correction circuits, one or more Field Programmable Gate Arrays (FPGAs), one or more Host Interface Layers (HILs), one or more Flash Translation Layers (FTLs), one or more Flash Interface Layers (FILs), or a combination thereof.

The latency calculation circuit 104 may calculate latency for a command divided into internal processing units rather than a command itself. The latency calculation circuit 104 may receive, from the processor 102, a time point for dividing a command into internal processing units and a time point for executing a command of the internal processing unit. The latency calculation circuit 104 may be implemented in an HIL.

The latency calculation circuit 104 may calculate latency of the storage device 120 itself based on the two time points. The calculated latency may calculate the latency of the storage device 120 itself independently of the complex workload situation of the host 142. An operating method for the latency calculation circuit 104 to calculate the latency is described below in detail for each command.

The processor 102 may be configured to facilitate transfer of data and/or commands between the host 142 and the buffer memory (for example, memory 122). The host 142 may transmit data and/or commands to the storage device 120, and the transmitted data and/or commands may be received by the storage controller 100 and processed with the buffer memory. The processor 102 may be implemented in an FTL or HIL.

The HIL may transmit read or write commands of the host 142 to the FTL. The FTL may manage main operations of the storage device 120. For example, the FTL may map a logical block address (LBA) of the host 142 and a physical block address (PBA) of the buffer memory. The FTL may periodically perform garbage collection to secure a free block for writing data. The FIL may perform input/output between the buffer memory and the storage controller 100. For example, write data may be programmed to a mapped physical page address through the FTL, or data of a mapped physical page address may be read.

The buffer memory may include non-volatile memory. The buffer memory may further include a buffer memory that is a volatile memory. According to other example embodiments, the buffer memory may include one or more flash memory chips or one or more other storage media.

The buffer memory may be connected to the storage controller 100 through a plurality of channels. One or more memories 122 may be connected to one channel, and the memories 122 connected to one channel may be connected to the same data bus.

The methods, processes, and algorithms may be implemented in a controller such as the storage controller 100 and a command fetcher and a command processor may be implemented in the processor 102 of the storage controller 100.

Figure 2:
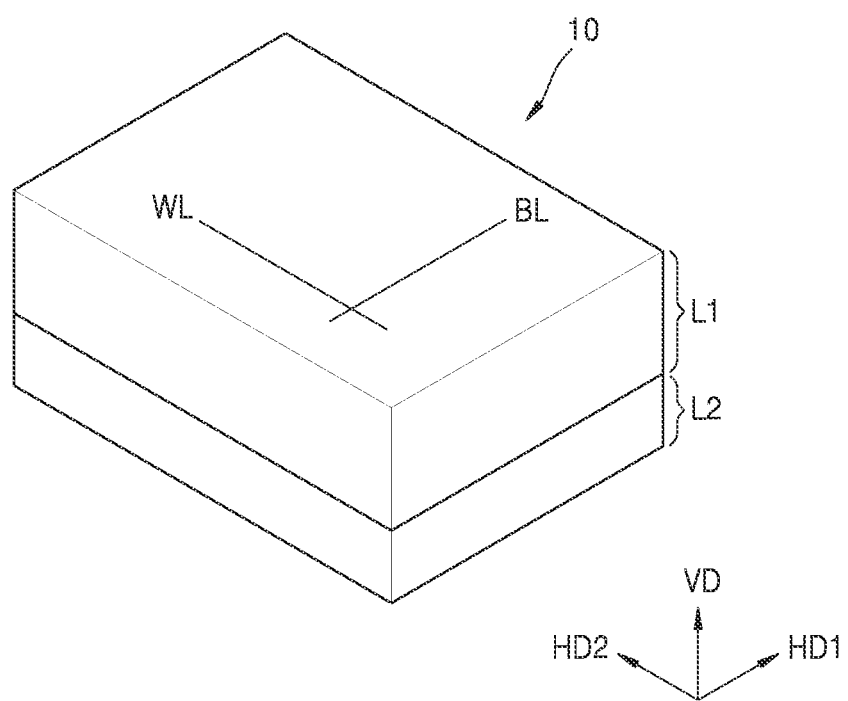
FIG. 2 is a diagram schematically illustrating a structure of a memory according to example embodiments.

FIG. 2 is a diagram schematically illustrating a structure of a memory according to example embodiments.

A memory 10 may include a memory cell array (not shown) and a peripheral circuit PECT (not shown).

The memory cell array according to example embodiments may be connected to a page buffer circuit through bit lines BL, and may be connected to a row decoder through word lines WL, string select lines SSL, and ground select lines GSL. The memory cell array may include memory cells, and the memory cells may be, for example, flash memory cells. Hereinafter, example embodiments of the inventive concepts are described taking an example embodiment in which a plurality of memory cells are NAND flash memory cells as an example. However, the inventive concepts are not limited thereto, and a memory cell array according to other example embodiments may include resistive memory cells, such as resistive RAM (ReRAM), phase change RAM (PRAM), or magnetic RAM (MRAM).

A memory cell array according to example embodiments may include a three-dimensional memory cell array, and the three-dimensional memory cell array may include a plurality of NAND strings, and each NAND string may include memory cells respectively connected to word lines vertically stacked on a substrate. U.S. Pat. Nos. 7,679,133, 8,553,466, 8,654,587, 8,559,235, and US Patent Application Publication No. 2011/0233648 are incorporated in their entirety herein by reference. A memory cell array according to other example embodiments may include a two-dimensional memory cell array, and the two-dimensional memory cell array may include a plurality of NAND strings disposed in row and column directions. In some example embodiments, the memory cell array may include other various types of non-volatile memories, and accordingly, the non-volatile buffer memory may include MRAM, spin-transfer torque MRAM, conductive bridging RAM (CBRAM), ferroelectric RAM (FeRAM), phase RAM (PRAM), ReRAM, and other types of memory.

Referring to FIG. 2, the memory 10 may include a first semiconductor layer L1 and a second semiconductor layer L2, and the first semiconductor layer L1 may be stacked in a direction VD perpendicular to the second semiconductor layer L2. In particular, the second semiconductor layer L2 may be disposed below the first semiconductor layer L1 in the vertical direction VD, and accordingly, the second semiconductor layer L2 may be disposed close to the substrate.

According to example embodiments, a memory cell array may be formed in the first semiconductor layer L1, and a peripheral circuit PECT may be formed in the second semiconductor layer L2. Accordingly, the memory 10 may have a structure in which the memory cell array is disposed above the peripheral circuit PECT, that is, a Cell Over Periphery (COP) structure. The COP structure may effectively reduce an area in a horizontal direction and improve the degree of integration of the memory 10.

According to example embodiments, the second semiconductor layer L2 may include a substrate SUB, and transistors and metal patterns for wiring the transistors are formed on the substrate SUB, so that a peripheral circuit PECT may be formed in the second semiconductor layer L2. After the peripheral circuit PECT is formed in the second semiconductor layer L2, a first semiconductor layer L1 including a memory cell array may be formed on the second semiconductor layer L2, and metal patterns may be formed to electrically connect word lines WL and bit lines BL of the memory cell array to the peripheral circuit PECT formed in the second semiconductor layer L2. For example, the bit lines BL may extend in the first horizontal direction HD1, and the word lines WL may extend in the second horizontal direction HD2.

With the development of semiconductor processes, as the number of stages of memory cells disposed in a memory cell array increases, that is, as the stacked number of word lines WL increases, the area of the memory cell array is reduced, and accordingly, the area of the peripheral circuit PECT is also reduced. According to some example embodiments, to reduce the area occupied by the page buffer circuit, the page buffer circuit may have a structure in which the page buffer unit and the cache latch are separated.

Figure 3:
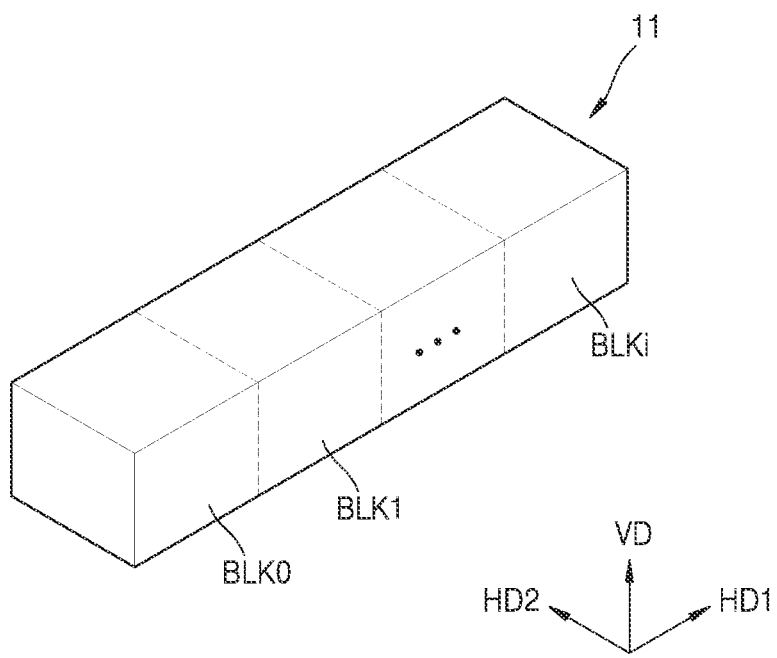
FIG. 3 is a diagram illustrating a memory cell array according to example embodiments.

FIG. 3 is a diagram illustrating a memory cell array according to example embodiments.

Referring to FIG. 3, the memory cell array may include memory blocks BLK0 to BLKi, where i is a positive integer, and each of the memory blocks BLK0 to BLKi may have a three-dimensional structure (or vertical structure). Each of the memory blocks BLK0 to BLKi may include a plurality of NAND strings extending in the vertical direction VD. The memory blocks BLK0 to BLKi may be selected by a row decoder.

Figure 4:
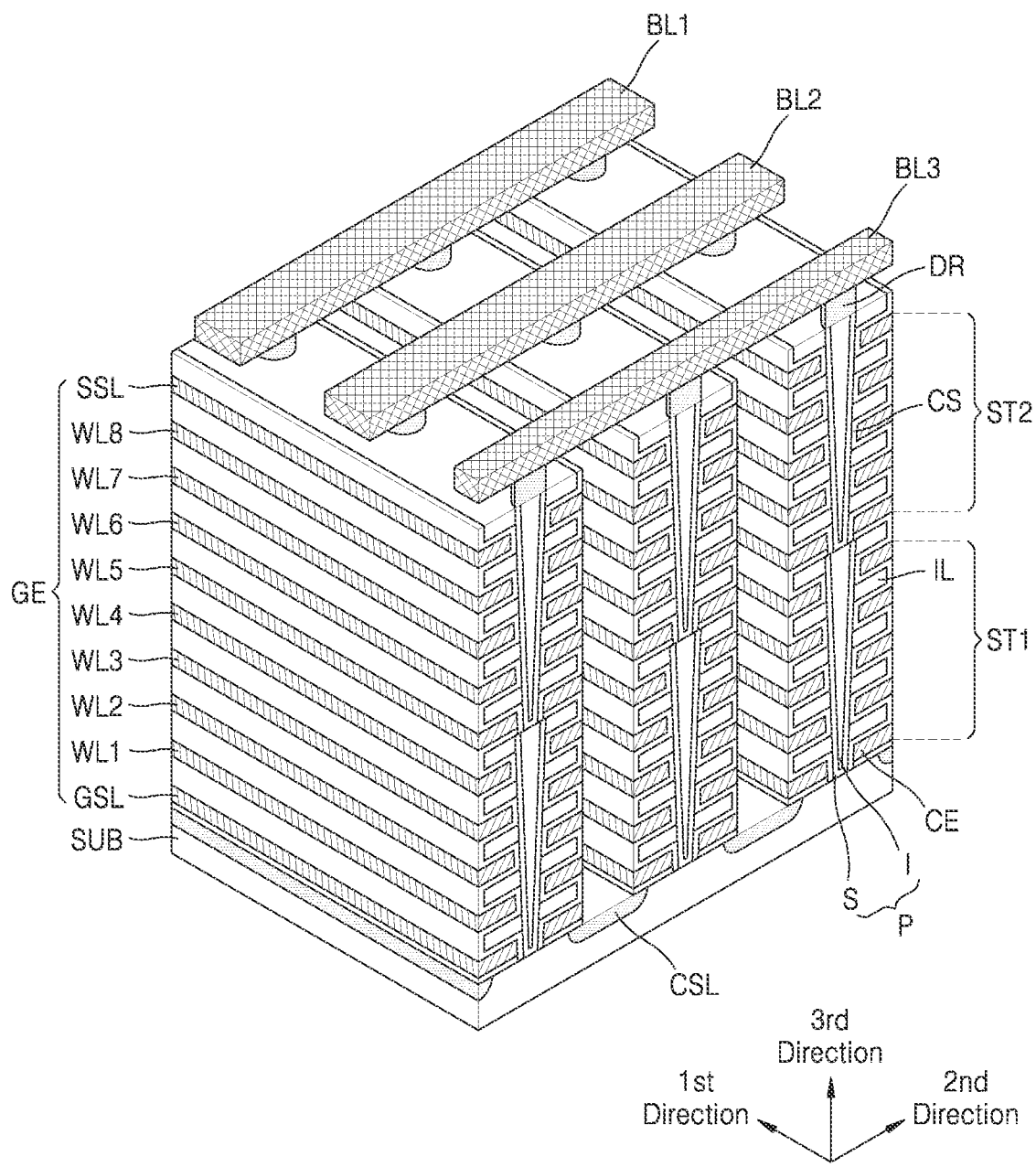
FIG. 4 is a perspective view illustrating a memory block according to example embodiments.

FIG. 4 is a perspective view illustrating a memory block according to example embodiments.

Referring to FIG. 4, each of the memory blocks (e.g., BLK0 to BLKi of FIG. 3) included in the memory cell array is formed in a direction perpendicular to the substrate SUB. In FIG. 4, the memory block BLK1 is shown as including 2 select lines GSL and SSL, 8 word lines WL1 to WL8, and 3 bit lines BL1 to BL3, but in reality, they may be more or less.

The substrate SUB may be provided with a common source line CSL having a first conductivity type (e.g., p-type), extending in the first direction on the substrate SUB, and doped with impurities of a second conductivity type (e.g., n-type).

The substrate SUB may be a bulk silicon substrate, a silicon on insulator (SOI) substrate, a germanium substrate, a germanium on insulator (GOI) substrate, a silicon-germanium substrate, or a substrate of an epitaxial thin film obtained by performing selective epitaxial growth (SEG).

The substrate SUB may be made of a semiconductor material, and for example, may include at least one of silicon (Si), germanium (Ge), silicon germanium (SiGe), gallium arsenide (GaAs), indium gallium arsenide (InGaAs), aluminum gallium arsenide (AlGaAs), and mixtures thereof.

A first memory stack ST1 may be provided on the substrate SUB. For example, on the region of the substrate SUB between two adjacent common source lines CSL, a plurality of insulating films IL extending in the first direction are sequentially provided in the third direction, and the plurality of insulating films IL may be spaced apart by a specific distance in the third direction. For example, the plurality of insulating films IL may include an insulating material such as silicon oxide.

On the area of the substrate SUB between two adjacent common source lines CSL, a plurality of pillars P may be sequentially disposed in the first direction and etched through the plurality of insulating films IL in the third direction. For example, the plurality of pillars P may penetrate the plurality of insulating films IL to contact the substrate SUB.

For example, a surface layer S of each pillar P may include the first type of silicon material and function as a channel region. The inner layer I of each pillar P may include an insulating material, such as silicon oxide or an air gap.

In a region between two adjacent common source lines CSL, a charge storage layer CS may be provided along exposed surfaces of the insulating films IL, the pillars P, and the substrate SUB. The charge storage layer CS may include a gate insulating layer (also referred to as a 'tunneling insulating layer'), a charge trap layer, and a blocking insulating layer. For example, the charge storage layer CS may have an oxide-nitride-oxide (ONO) structure. Also, in a region between two adjacent common source lines CSL, gate electrodes GE, such as select lines GSL and SSL, and word lines WL1 to WL4 may be provided on the exposed surface of the charge storage layer CS.

In the memory block BLK1 according to the technical idea of the inventive concepts, a second memory stack ST2 formed by the same method may be additionally provided on the first memory stack ST1 formed by the above method. Drains or drain contacts DR may be respectively provided on the plurality of pillars P extending up to the second memory stack ST2.

For example, the drains or drain contacts DR may include a silicon material doped with impurities having the second conductivity type. Bit lines BL1 to BL3 extending in the second direction and spaced apart from each other by a specific distance in the first direction may be provided on the drains or drain contacts DR.

Figure 5:
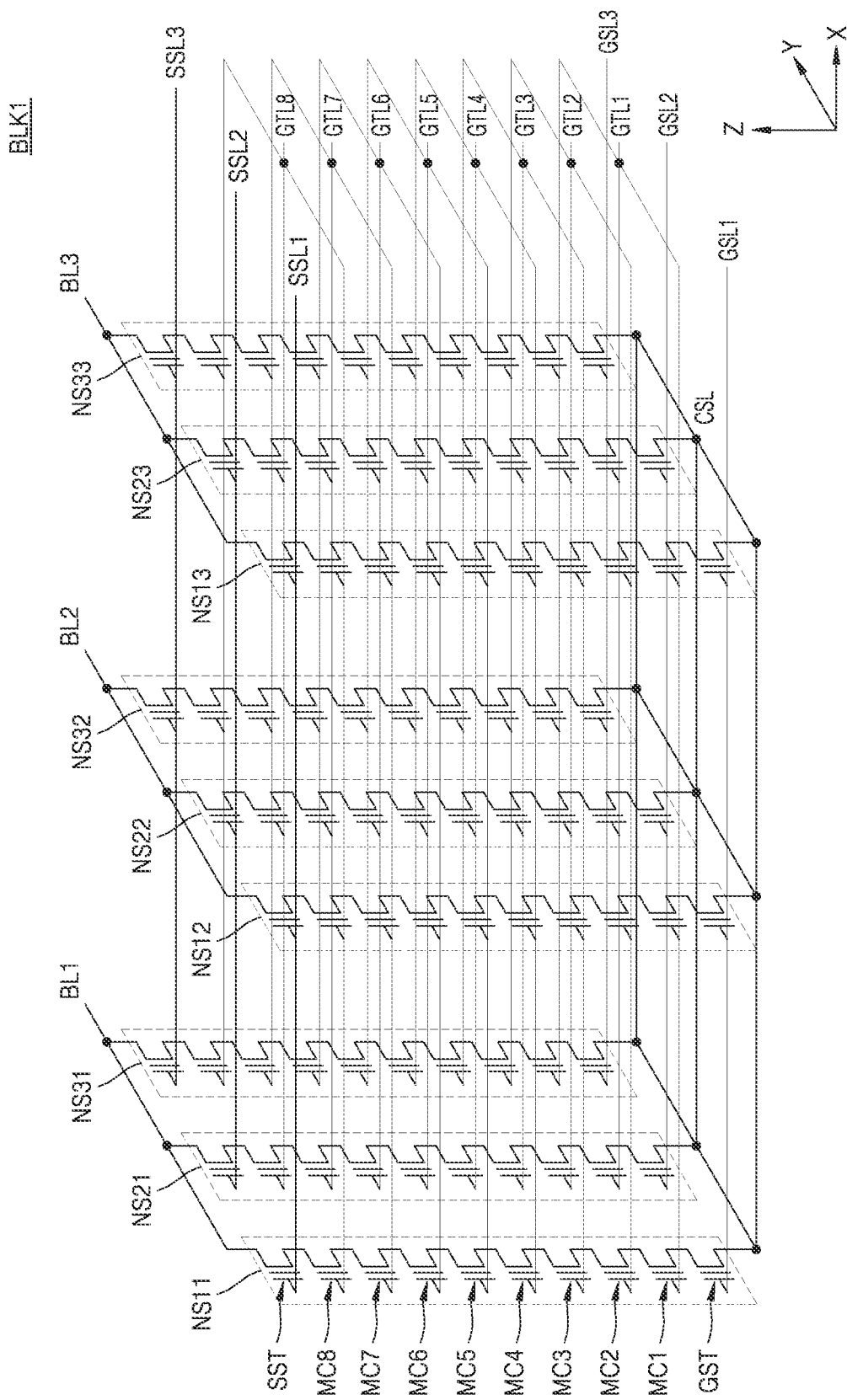
FIG. 5 is a circuit diagram illustrating an equivalent circuit of a first memory block among memory blocks according to example embodiments.

FIG. 5 is a circuit diagram illustrating an equivalent circuit of a first memory block among memory blocks according to example embodiments.

Referring to FIG. 5, a first memory block BLK1 may be a NAND flash memory having a vertical structure, and each of the memory blocks BLK1 to BLKz included in the memory cell array may be implemented as shown in FIG. 5.

The first memory block BLK1 may include a plurality of NAND cell strings NS11 to NS33, a plurality of word lines (e.g., WL1 to WL8 of FIG. 4), a plurality of bit lines BL1 to BL3, a plurality of ground select lines GSL1 to GSL3, a plurality of string select lines SSL1 to SSL3, and a common source line CSL. The number of NAND cell strings, the number of word lines, the number of bit lines, the number of ground select lines, and the number of string select lines may be variously changed according to example embodiments.

The NAND cell strings NS11, NS21, and NS31 are provided between the first bit line BL1 and the common source line CSL, and the NAND cell strings NS12, NS22, and NS32 are provided between the second bit line BL2 and the common source line CSL. Each NAND cell string (e.g., NS11) may include a string select transistor SST, a plurality of memory cells MC1 to MC8, and a ground select transistor GST connected in series.

NAND cell strings commonly connected to one bit line may constitute one column. For example, the NAND cell strings NS11, NS21, and NS31 commonly connected to the first bit line BL1 may correspond to the first column, the NAND cell strings NS12, NS22, and NS32 commonly connected to the second bit line BL2 may correspond to the second column, and the NAND cell strings NS13, NS23, and NS33 commonly connected to the third bit line BL3 may correspond to the third column.

NAND cell strings connected to one string select line may constitute one row. For example, the NAND cell strings NS11, NS12, and NS13 connected to the first string select line SSL1 may correspond to the first row, the NAND cell strings NS21, NS22, and NS23 connected to the second string select line SSL2 may correspond to the second row, and the NAND cell strings NS31, NS32, and NS33 connected to the third string select line SSL3 may correspond to the third row.

The string select transistor SST may be connected to corresponding string select lines SSL1 to SSL3. The plurality of memory cells MC1 to MC8 may be connected to corresponding word lines WL1 to WL8, respectively. The ground select transistors GST may be connected to corresponding ground select lines GSL1 to GSL3, and the string select transistors SST may be connected to corresponding bit lines BL1 to BL3. The ground select transistor GST may be connected to the common source line CSL.

In some example embodiments, word lines (e.g., WL1) of the same height may be commonly connected to each other, string select lines SSL1 to SSL3 may be separated from each other, and ground select lines GSL1 to GSL3 may also be separated from each other. For example, when programming memory cells included in the NAND cell strings NS11, NS12, and NS13 connected to the first word line WL1 and corresponding to the first column, a first word line WL1 and a first string select line SSL1 may be selected. However, the inventive concepts are not limited thereto, and in other example embodiments, the ground select lines GSL1 to GSL3 may be connected in common.

Figure 6:
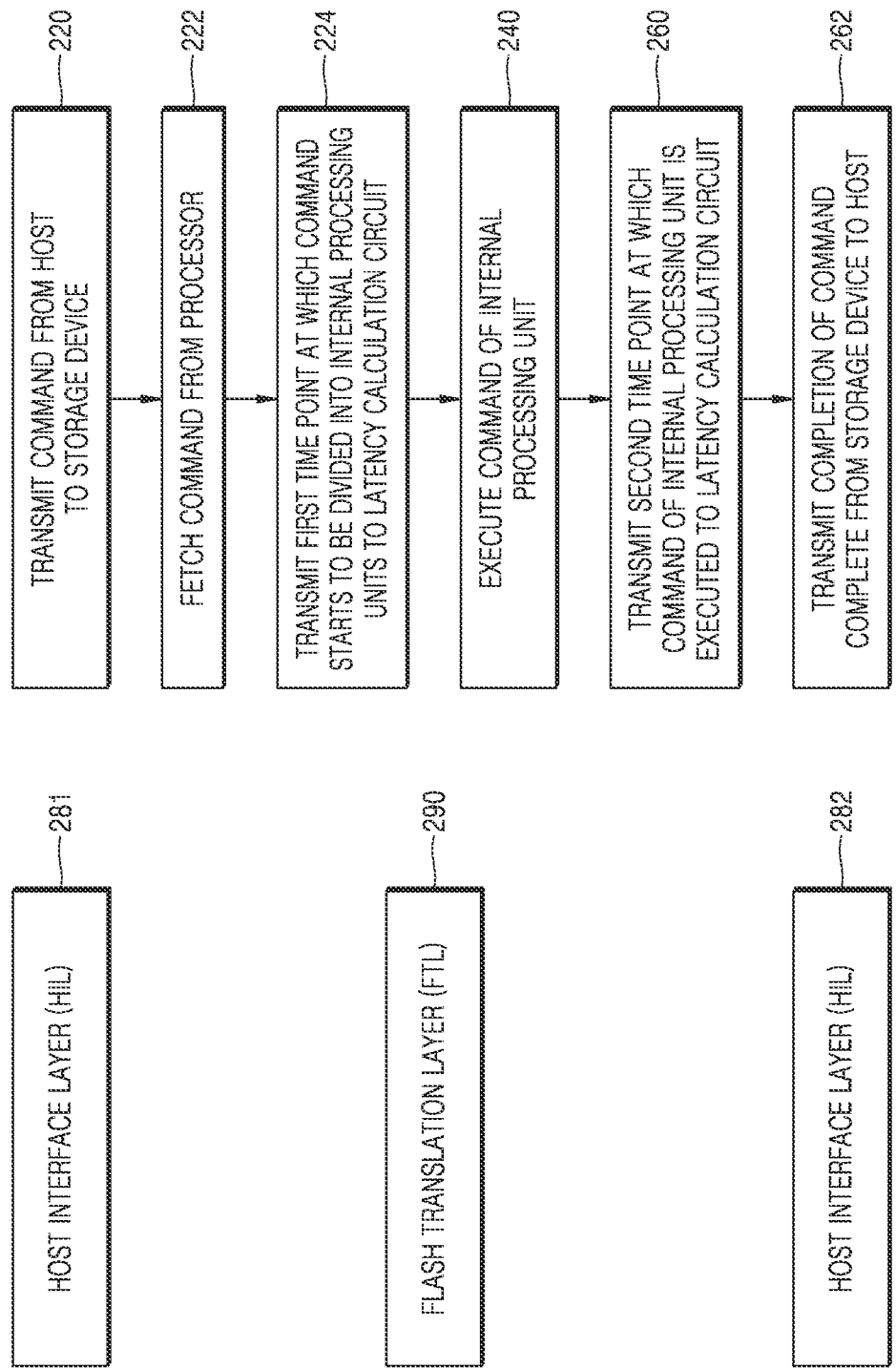
FIG. 6 is a diagram for describing an operation of a storage system according to example embodiments.

FIG. 6 is a diagram for describing an operation of a storage system according to example embodiments.

Referring to FIG. 6, in operation 220, the processor 102 in an HIL 281 may receive a command from the host 142 and store the received command in a command queue. According to operation 222, the processor 102 in the HIL 281 may fetch the command stored in the command queue.

The processor 102 may divide the fetched commands into internal processing units. According to example embodiments, an internal processing unit may be specifically a logical block mapping unit (hereinafter referred to as a mapping unit). The internal processing unit may differ according to the type of command. For example, in the example embodiment of a read command or a write command, the internal processing unit may be a page size. In another example, in the example embodiment of a trim command, the internal processing unit may be a block size. However, the inventive concepts are not limited thereto, and an internal processing unit according to other example embodiments may be an LBA or direct memory access (DMA).

According to operation 224, the processor 102 in the HIL 281 may divide the fetched command according to internal processing units, identify the divided time point, and store the divided time point as a first time point. For example, the first time point may be a time point at which division according to an internal processing unit starts to be performed for the command The processor 102 may transmit the stored first time point to the latency calculation circuit 104.

According to operation 240, in an FTL 290, the processor 102 divides the fetched command into internal processing units and executes the fetched command. For example, when the fetched command is read or write, the processor 102 may start executing the command of the internal processing unit for the buffer memory that is the target of the command. In another example, when the fetched command is trim, the processor 102 may start executing the trim command of the internal processing unit for the buffer memory that is the target of the command.

According to operation 260, the processor 102 in the HIL 281 may identify a time point at which the command of the internal processing unit is completed and store the time point as a second time point. The processor 102 may transmit the stored second time point to the latency calculation circuit 104. Independently of the processor 102 transmitting the first time point and the second time point to the latency calculation circuit 104 in the HIL 282, in the FTL 290, the processor 102 may execute commands of the internal processing unit on the buffer memory.

In the HILs 281 and 282, the processor 102 may identify and store the first time point and the second time point based on commands divided into internal processing units rather than commands themselves. Accordingly, independently of the processor 102 calculating the latency based on the stored first time point and second time point, the processor 102 may store and fetch commands received from the host 142 in the command queue of the storage device 120.

When the processor 102 completes executing the command for the buffer memory in the FTL 290, in accordance with operation 262, the processor 102 may transmit the complete command from the storage device 120 to the host 142 at the HIL 282.

FIGS. 7 to 10 are flowcharts illustrating an operation of a latency calculation circuit according to example embodiments.

Any of the components or combinations described with reference to FIGS. 7 to 10 may be used to perform one or more of the tasks of the flowchart. The operations in the flowcharts are illustrative and may include various additional operational tasks not explicitly described. The chronological sequence of work operations may be changed.

The latency calculation circuit 104 according to example embodiments defines a time point at which commands are divided into internal processing units as a first time point, and defines a time point at which the command of the internal processing unit is completed as the second time point to calculate a latency. For example, independently of the size of the command itself transmitted from the host 142 to the storage device 120 and/or the depth of the command queue in which the command is stored, the latency calculation circuit 104 may calculate latency based on a command of an internal processing unit.

Figure 7:
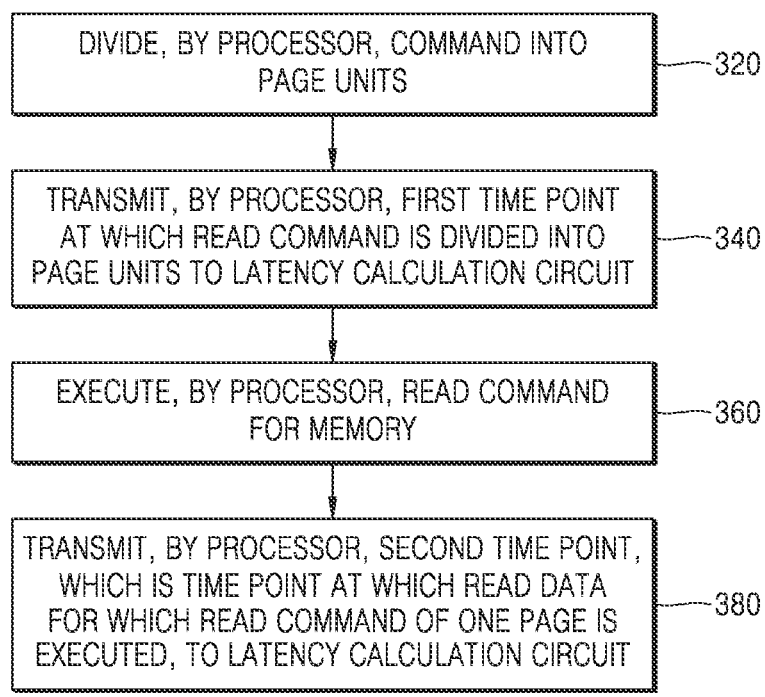
FIGS. 7 to 10 are flowcharts illustrating an operation of a latency calculation circuit according to example embodiments.

FIG. 7 is a flowchart illustrating a method of operating a processor for calculating a latency of a read command, according to example embodiments.

According to operation 320, in the HIL 281, the processor 102 may divide the read command for the non-volatile memory or the volatile buffer memory into page units.

According to operation 340, in the HIL 281, the processor 102 may identify a time point at which the read command is divided into page units, may store the identified time point as a first time point, and may transmit the stored first time point to the latency calculation circuit 104. For example, the first time point may be a time point at which division according to a page unit starts to be performed for a read command According to operation 360, the processor 102 at the FTL 290 may execute a read command on the buffer memory. The processor 102 may transmit the read data for which the read command has been executed to the host 142.

According to operation 380, in the HTL 282, the processor 102 may identify a time point at which read data for which a read command of one page is executed is transmitted to the host 142, may store the identified time point as a second time point, and may transmit the stored second time point to the latency calculation circuit 104. For example, the second time point may be a time point at which read data for a page read command starts to be transmitted to the host 142.

The latency calculation circuit 104 according to the inventive concepts may calculate latency based on the received first time point and the received second time point. For example, the latency calculation circuit 104 may calculate the difference between the first time point and the second time point as latency of a read command for the buffer memory of the storage device 120 itself. Operations 320 to 380 described above may be performed inside the storage device 120 without being affected by the host 142.

Figure 8:
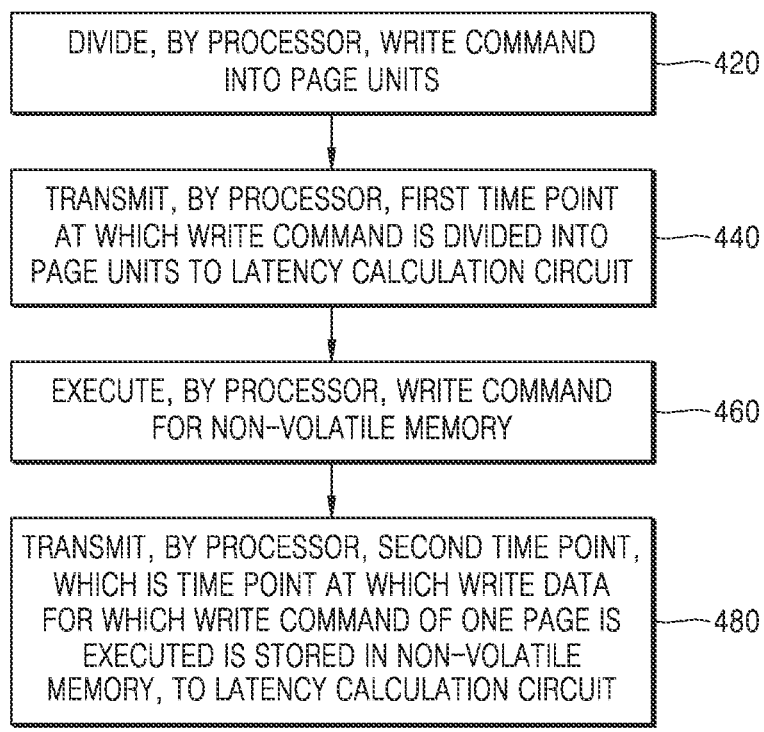

FIG. 8 is a flowchart illustrating a method of operating a processor for calculating a latency of a write command, according to example embodiments.

According to operation 420, in the HIL 281, the processor 102 may divide the write command for the buffer memory corresponding to the non-volatile memory into page units.

According to operation 440, in the HIL 281, the processor 102 may identify a time point at which the write command is divided into page units, may store the identified time point as a first time point, and may transmit the stored first time point to the latency calculation circuit 104. For example, the first time point may be a time point at which division according to a page unit starts to be performed for a write command.

According to operation 460, the processor 102 at the FTL 290 may execute a write command on the buffer memory. The processor 102 may store write data for which a write command has been executed in the buffer memory.

According to operation 480, the processor 102 in the HTL 282 may identify the time point stored in the buffer memory of the write data for which the write command for one page is executed, may store the identified time point as a second time point, and may transmit the stored second time point to the latency calculation circuit 104. For example, the second time point may be a time point at which write data for a page write command starts to be stored in the buffer memory.

The latency calculation circuit 104 according to the inventive concepts may calculate latency based on the received first time point and the received second time point. For example, the latency calculation circuit 104 may calculate the difference between the first time point and the second time point as latency of a write command for the buffer memory of the storage device 120 itself. Operations 420 to 480 described above may be performed inside the storage device 120 without being affected by the host 142.

Figure 9:
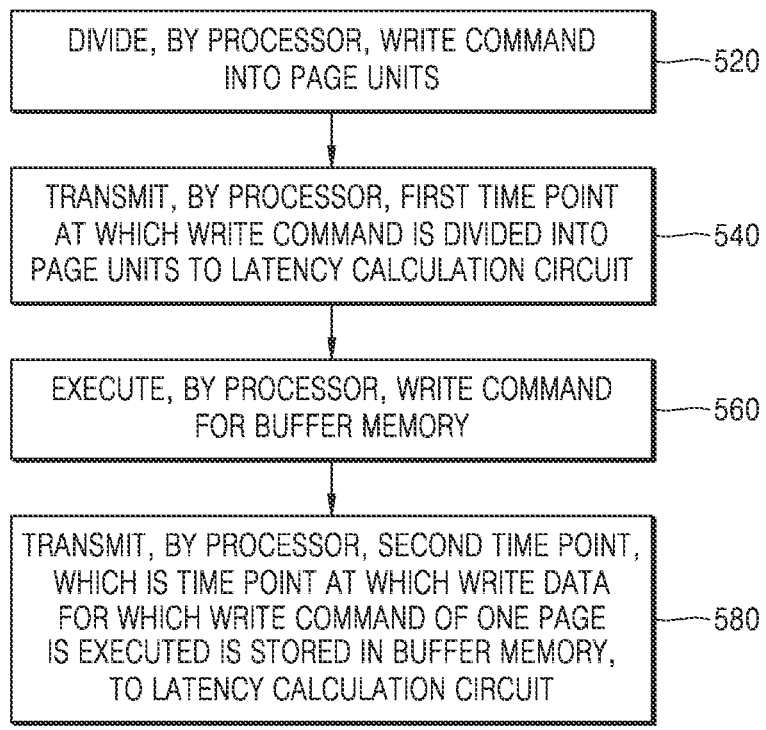

FIG. 9 is a flowchart illustrating a method of operating a processor for calculating a latency of a write command, according to other example embodiments.

According to operation 520, the processor 102 in the HIL 281 may divide the write command for the buffer memory into page units. The buffer memory may be a buffer memory that is a volatile memory.

According to operation 540, in the HIL 281, the processor 102 may identify a time point at which the write command is divided into page units, may store the identified time point as a first time point, and may transmit the stored first time point to the latency calculation circuit 104. For example, the first time point may be a time point at which division according to a page unit starts to be performed for a read command.

According to operation 560, the processor 102 at the FTL 290 may execute a write command on the buffer memory. The processor 102 may store write data for which a write command has been executed in the buffer memory.

According to operation 580, the processor 102 in the HTL 282 may identify the time point stored in the buffer memory of the write data for which the write command for one page is executed, may store the identified time point as a second time point, and may transmit the stored second time point to the latency calculation circuit 104. For example, the second time point may be a time point at which write data for a page write command starts to be stored in the buffer memory.

The latency calculation circuit 104 according to the inventive concepts may calculate latency based on the received first time point and the received second time point. For example, the latency calculation circuit 104 may calculate the difference between the first time point and the second time point as latency of a write command for the volatile buffer memory of the storage device 120 itself. Operations 520 to 580 described above may be performed inside the storage device 120 without being affected by the host 142.

Figure 10:
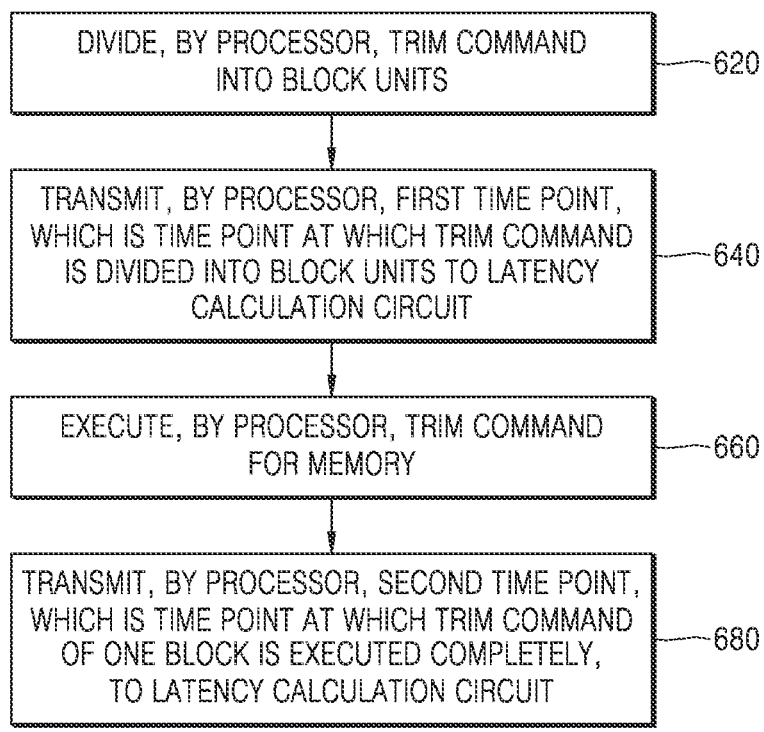

FIG. 10 is a flowchart illustrating a method of operating a processor for calculating a latency of a trim command, according to example embodiments.

According to operation 620, the processor 102 in the HIL 281 may divide the trim command for the non-volatile or volatile buffer memory into blocks.

According to operation 640, in the HIL 281, the processor 102 may identify a time point at which the trim command is divided into blocks, may store the identified time point as a first time point, and may transmit the stored first time point to the latency calculation circuit 104. For example, the first time point may be a time point at which segmentation according to a block unit starts to be performed for the trim command.

In the following operation 660, the processor 102 at the FTL 290 may execute a trim command on the buffer memory. The processor 102 may trim data by executing the trim command.

According to operation 680, the processor 102 in the HTL 282 may identify a time point at which the trim command of one block is executed and store the time point as a second time point, and transmit the stored second time point to the latency calculation circuit 104. For example, the second time point may be a time point at which the trim command of one block is executed and data starts to be trimmed from the buffer memory.

The latency calculation circuit 104 according to the inventive concepts may calculate latency based on the received first time point and the received second time point. For example, the latency calculation circuit 104 may calculate the difference between the first time point and the second time point as latency of a trim command for the buffer memory of the storage device 120 itself. Operations 620 to 680 described above may be performed inside the storage device 120 without being affected by the host 142.

Figure 11:
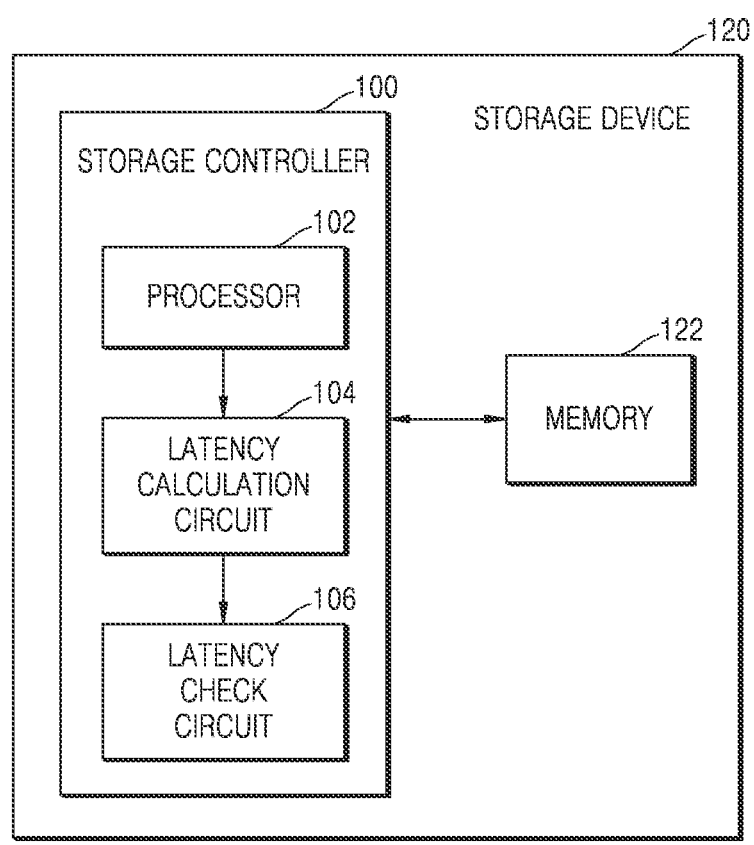
FIG. 11 is a diagram illustrating a storage device according to other example embodiments.

FIG. 11 is a diagram illustrating a storage device according to other example embodiments.

The storage device 120 may include a storage controller 100 and a buffer memory connected to the storage controller 100. Compared to FIG. 1, the storage controller 100 of the storage device 120 according to other example embodiments may include a plurality of processors 102 and a plurality of latency calculation circuits 104, and may further include one or more latency check circuits 106.

The latency calculation circuit 104 receives a first time point at which commands are divided into internal processing units from the processor 102 and a second time point at which the commands of the internal processing units are completed for the buffer memory, so that the difference between the first time point and the second time point may be calculated as latency.

The storage device 120 may preset a threshold latency. The latency calculation circuit 104 may determine whether the calculated latency exceeds a threshold latency. The storage device 120 may determine that a latency spike has occurred when a latency exceeding a threshold latency occurs.

Accordingly, the latency calculation circuit 104 may compare the latency calculated based on the first time point and the second time point with a threshold latency preset in the storage device 120, and determine whether the calculated latency exceeds the threshold latency. When the latency calculation circuit 104 determines that the calculated latency exceeds the threshold latency, it may be determined that a latency spike has occurred in the storage device 120 itself. That is, the storage device 120 may determine a situation in which a latency spike occurs independently of a complicated workload situation of the host 142.

The latency check circuit 106 may store information about the generated latency when it is determined that the latency calculated by the latency calculation circuit 104 exceeds the threshold latency.

The information about latency may be, for example, information about firmware data or log data. In another example, in the process of dividing the trim command into blocks, which are internal processing units, the information about latency may be information about an error in which commands are divided into more than a preset unit in one block unit. However, the information on latency is not limited to the above-described example embodiments, and may include all information on latency that may occur internally in the storage device 120.

According to an example, the latency check circuit 106 may generate all information for debugging based on a snapshot of a time point at which a latency spike occurs.

According to another example, the latency check circuit 106 may calculate a latency consistency level and/or a quality of service (QoS) for a corresponding command based on the stored latency information. The latency check circuit 106 may utilize the internal buffer memory of the storage device 120 or a separate memory.

The latency check circuit 106 may calculate a latency consistency level capable of estimating a variation range of latency based on latency information stored for a corresponding command. As the variation range of latency is narrow, the latency consistency level may be calculated higher.

The narrower the variation range of latency, the easier it is to predict latency and the easier it is to prepare a preventive measure. The narrower the variation range of the latency, the better the QoS of the storage device.

Figure 12:
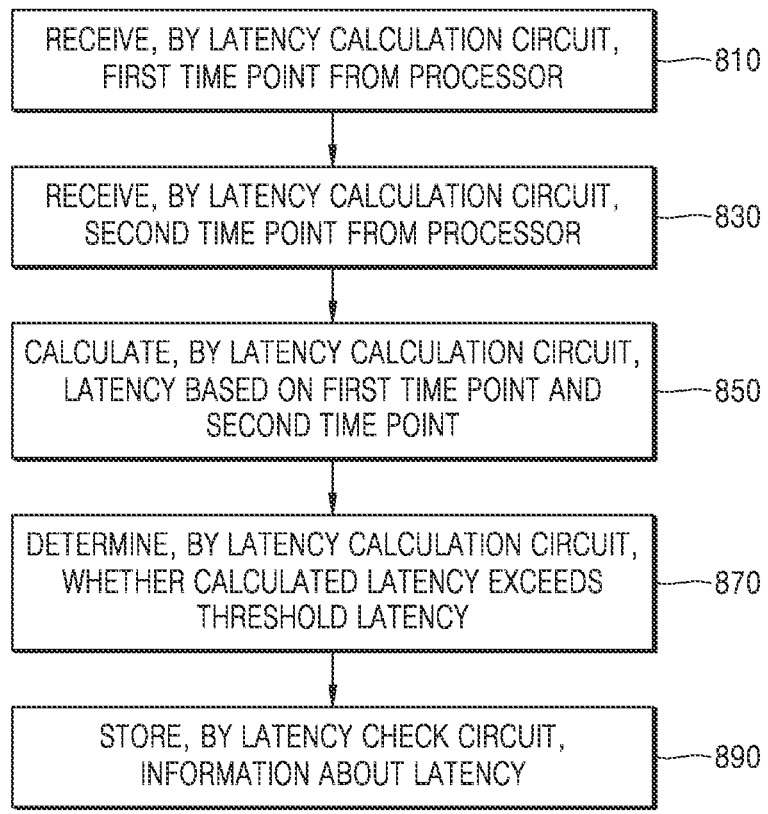
FIG. 12 is a flowchart illustrating operations of a latency calculation circuit and a latency check circuit according to example embodiments.

FIG. 12 is a flowchart illustrating operations of a latency calculation circuit and a latency check circuit according to example embodiments.

Referring to FIG. 12, in operation 810, the latency calculation circuit 104 in the HIL 281 may receive a first time point, which is a time point at which the command is divided into internal processing units, from the processor 102.

According to operation 830, the latency calculation circuit 104 in the HIL 282 may receive a second time point, which is a time point at which the execution of the command of the internal processing unit is completed, from the processor 102.

In operation 850, the latency calculation circuit 104 in the HIL 282 may calculate latency of the storage device 120 through a difference between the first time point and the second time point received from the processor 102.

According to operation 870, the latency calculation circuit 104 in the HIL 282 may compare the calculated latency with the threshold latency preset in the storage device 120, and determine whether the calculated latency exceeds the threshold latency.

When the latency calculation circuit 104 determines that the calculated latency exceeds the threshold latency so that the storage device 120 determines that a latency spike situation has occurred, in operation 890, the latency check circuit 106 in the HIL 282 may store information about the generated latency using the buffer memory or another storage medium.

Figure 13:
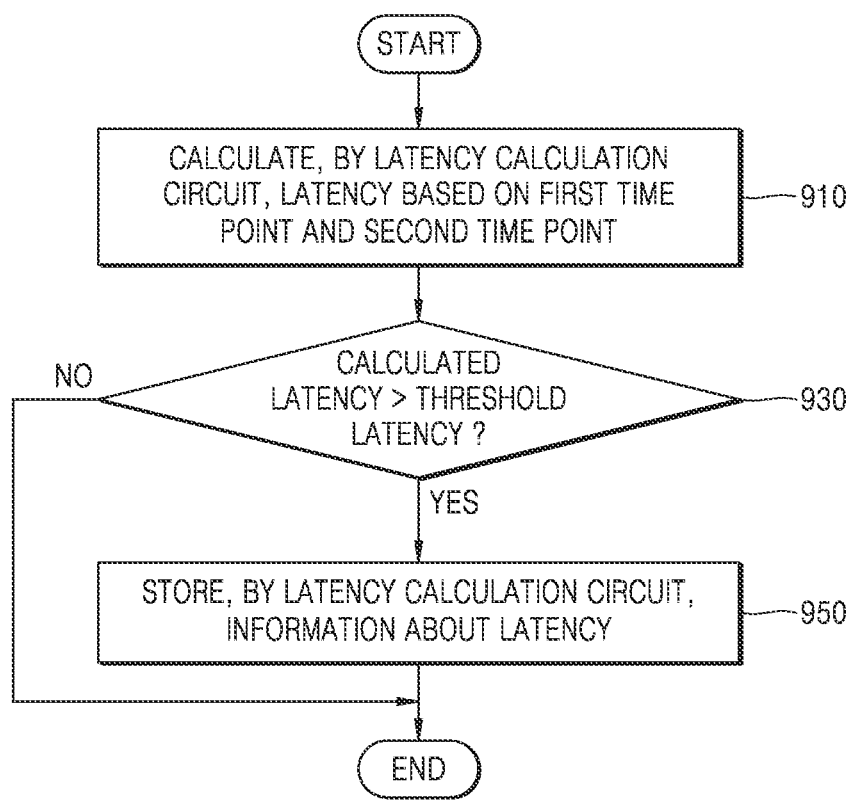
FIG. 13 is a flowchart illustrating operations of a latency calculation circuit and a latency check circuit according to example embodiments.

FIG. 13 is a flowchart illustrating operations of a latency calculation circuit and a latency check circuit according to example embodiments.

The latency calculation circuit 104 according to example embodiments calculates latency based on the first time point and the second time point received from the processor 102 in operation 910, and determines whether the calculated latency exceeds the preset reference latency in operation 930, and if calculated latency exceeds the preset reference latency, the latency check circuit 106 according to example embodiments stored the generated latency information in the buffer memory or the like in operation S950, and if calculated latency does not exceed the preset reference latency, the latency check circuit 106 may not store the generated latency information.

One or more of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:

1. A storage device comprising:
a non-volatile memory; and
a storage controller configured to control the non-volatile memory,
wherein the storage controller comprises
a processor configured to receive and fetch a command for the non-volatile memory from a host, divide and execute the command into internal processing units, and transmit indication of completion of the command to the host, and
a latency calculation circuit configured to calculate a latency for the command by receiving, from the processor, a first time point at which the processor divides the command into the internal processing units and a second time point at which the processor executes the command of an internal processing unit from among the internal processing units,
wherein the latency calculation circuit is configured to determine whether the latency calculated based on the first time point and the second time point exceeds a preset threshold latency.

2. The storage device of claim 1, wherein the processor is implemented in a flash translation layer or a host interface layer,
wherein the latency calculation circuit is implemented in the host interface layer.

3. The storage device of claim 1, wherein the latency calculation circuit is configured to receive the first time point and the second time point from the processor, and the latency calculation circuit is configured to calculate the latency for the command as a difference between the first time point and the second time point.

4. The storage device of claim 1, further comprising a latency check circuit configured to store information about the latency responsive to the latency calculation circuit determining that the latency exceeds the preset threshold latency.

5. The storage device of claim 1, wherein the processor is configured, responsive to the command being a read command, to provide to the latency calculation circuit the first time point as a time point at which the read command fetched from the host to the processor starts to be divided into page units, and the second time point as a time point at which read data for which the read command of one page is executed starts to be transmitted to the host.

6. The storage device of claim 1, wherein the processor is configured, responsive to the command being a write command, to provide to the latency calculation circuit the first time point as a time point at which the write command fetched from the host to the processor starts to be divided into page units, and the second time point as a time point at which write data for which the write command of one page is executed starts to be stored in the non-volatile memory.

7. The storage device of claim 1, further comprising a buffer memory,
wherein the processor is configured, responsive to the command being a write command, to provide to the latency calculation circuit the first time point as a time point at which the write command fetched from the host to the processor starts to be divided into page units, and the second time point as a time point at which write data for which the write command of one page is executed starts to be stored in the buffer memory.

8. The storage device of claim 1, wherein the processor is configured, responsive to the command being a trim command, to provide to the latency calculation circuit the first time point as a time point at which the trim command fetched from the host to the processor starts to be divided into blocks, and the second time point as a time point at which the trim command of one block starts to be executed.

9. An operating method of a storage controller, the method comprising:
fetching, by a processor, a command for a non-volatile memory received from a host;
dividing, by the processor, the command into internal processing units;
transmitting, by the processor, a first time point at which the command is divided into internal processing units to a latency calculation circuit;
executing, by the processor, the command of an internal processing unit from among the internal processing units to a memory;

transmitting, by the processor, a second time point at which the command of the internal processing unit is executed to the latency calculation circuit;

calculating, by the latency calculation circuit, latency for the command based on the first time point and the second time point; and determining, by the latency calculation circuit, whether the latency exceeds a preset threshold latency.

10. The method of claim 9, wherein the latency calculation circuit is configured to determine the latency for the command as a difference between the first time point and the second time point received from the processor.

11. The method of claim 10, further comprising storing, by a latency check circuit, information about the latency when the latency calculation circuit determines that the latency exceeds the preset threshold latency.

12. The method of claim 11, further comprising generating information for debugging based on the information about the latency stored by the latency check circuit.

13. The method of claim 12, further comprising calculating, by the latency check circuit, a latency consistency level or a quality of service based on the stored information about the latency.

14. The method of claim 9, further comprising:
receiving, by the processor, the command from the host; and
transmitting, by the processor, an indication of completion of the command to the host.

15. The method of claim 9, wherein, responsive to the command being a read command, the first time point is a time point at which the read command fetched from the host to the processor starts to be divided into page units, and the second time point is a time point at which read data for which the read command of one page is executed starts to be transmitted to the host.

16. The method of claim 9, wherein, responsive to the command being a write command, the first time point is a time point at which the write command fetched from the host to the processor starts to be divided into page units, and the second time point is a time point at which write data for which the write command of one page is executed starts to be stored in the non-volatile memory.

17. The method of claim 9, further comprising fetching, by the processor, a write command for a buffer memory received from the host to the processor,
wherein the first time point is a time point at which the write command fetched from the host to the processor starts to be divided into page units, and the second time point is a time point at which write data for which the write command of one page is executed starts to be stored in the buffer memory.

18. The method of claim 9, wherein, responsive to the command being a trim command, the first time point is a time point at which the trim command fetched from the host to the processor starts to be divided into blocks and the second time point is a time point at which the trim command of one block is executed and trimmed.

19. The method of claim 9, wherein the executing, by the processor, of the command of the internal processing unit for the memory comprises mapping a logical block address, which is a logical address of the host, and a physical block address, which is a physical address of the non-volatile memory, and
wherein the non-volatile memory comprises NAND flash memory.

20. A storage system comprising:
a host; and
a storage device configured to receive a command from the host and transmit an indication of completion of the command to the host,
wherein the storage device comprises
a storage controller configured to divide the command into internal processing units and execute the command in the internal processing units, and
a latency calculation circuit configured to calculate a latency for the command based on a first time point at which the command is divided into the internal processing units and a second time point at which the command of an internal processing unit from among the internal processing units is executed, and determine whether the latency exceeds a preset threshold latency.

* * * * *